Figure 1:
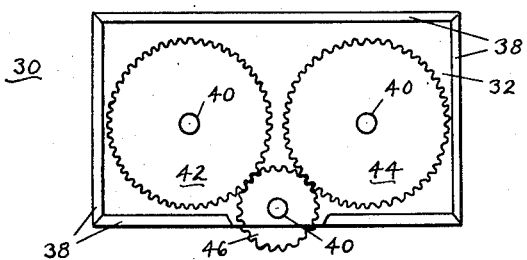

Aug. 20, 1957 C. W. LANGE, SR 2,803,246
OPTICAL INSTRUMENTS WHICH TEACH MENTAL
PERCEPTION OF VISUAL IMPRESSIONS
Original Filed Oct. 21, 1949 2 Sheets-Sheet 1

INVENTOR
CARL W. LANGE

Rey Eilers
ATTORNEY

INVENTOR
CARL W. LANGE
Rey Eilers
ATTORNEY

United States Patent Office 2,803,246
Patented Aug. 20, 1957

2,803,246

OPTICAL INSTRUMENTS WHICH TEACH MENTAL PERCEPTION OF VISUAL IMPRESSIONS

Carl W. Lange, Sr., St. Louis, Mo., assignor to Carl W. Lange, Jr., St. Louis, Mo.

Original application October 21, 1949, Serial No. 122,633, now Patent No. 2,741,245, dated April 10, 1956. Divided and this application June 15, 1953, Serial No. 361,625

8 Claims. (Cl. 128—76.5)

This invention relates to improvements in optical instruments. More particularly this invention relates to an improved optical instrument which teaches full mental perception of visual impressions received by the eyes.

It is therefore an object of the present invention to provide an improved optical instrument that teaches full mental perception of visual impressions received by the eyes.

This application is a division of my co-pending application Serial No. 122,633 and now Patent No. 2,741,245 for Optical Instruments Which Teach Mental Perception of Visual Impressions which was filed October 21, 1949.

It is frequently stated that defective vision is due to distortions or malformation of the cornea or the aqueous humor of the eyes. Any distortion or malformation of those two components of the eye could easily cause defective vision since these two components largely provide the refraction necessary for vision. In pursuance of the belief that defective vision is due to distortion or malformation of these components of the eye many of those skilled in the art equip patients, troubled with defective vision, with corrective spectacles. Others skilled in the art attempt to eliminate or minimize the defects or malformations in the cornea or aqueous humor of the eye by exercising the intrinsic and extrinsic muscles of the eye. The use of corrective spectacles can enable the patient to see with greater clarity, and exercising of the intrinsic and extrinsic muscles of the eye may help remove some strain on the cornea or aqueous humor, but in most cases neither corrective spectacles nor exercise of the intrinsic or extrinsic muscles of the eye will adequately correct the defective vision.

In some instances defective vision is actually due to defects or malformations in the cornea or aqueous humor of the eye, but in many more instances defective vision is due to inadequate or incorrect mental perception of the visual impressions received by the eyes. The cornea and the aqueous humor can be perfectly formed and can be free of distortion, and yet the patient's vision can be defective; the patient's brain being unable to perceive adequately or correctly the visual impressions received by the patient's eyes. In some instances the patient's brain almost completely suppresses the visual impressions from one eye; this phenomenon usually being noted in patients whose eyes are "crossed." In other instances the patient's brain will perceive visual impression from both eyes but will partially suppress the visual impressions from one of those eyes; this phenomenon usually being noted in patients having an amblyopic eye. In all such instances, the patient's brain will have a perception of the visual impressions received by the dominant eye but will have an appreciably weaker perception of the visual impressions received by the suppressed eye. Where defective vision is due to this inadequate or incorrect mental perception of the visual impressions received by the patient's eye, the use of corrective spectacles or the exercising of the intrinsic and extrinsic muscles of the eyes will be unable to improve the patient's vision for long, if at all. Such improvement in the patient's vision is, however, provided by the pattern-carrying charts contemplated by the present invention. Those charts teach the patient's brain to perceive the visual impressions received by the patient's suppressed eye while the patient's brain is also perceiving the visual impressions received by the patient's dominant eye. The attainment of mental perception of the visual impressions received by both eyes is usually the beginning of the elimination of defective vision. It is therefore an object of the present invention to provide pattern-carrying charts which teach the patient's brain to perceive visual impressions from both eyes.

The pattern-carrying charts provided by the present invention have portions that move. The charts are so constructed that distinctively different visual impressions will be received by each of the patient's eyes, and each of those impressions should be perceived by the patient's brain. Failure of the patient's brain to perceive the two different impressions will indicate which eye is suppressed; and thereafter a sufficiently high degree of stimulation can be given that eye, by motion of one portion of the trans-illuminated chart, to force the patient's brain to perceive the visual impression received by that eye. It is therefore an object of the present invention to provide instructive trans-illuminated charts that have portions which move.

Trans-illumination of the charts is of critical importance since mere flat lighting of a chart will not adequately stimulate mental perception. The brain is so accustomed to perceiving visual impressions of flat-lighted objects, because most objects viewed by the eye are flat-lighted, that the suppressed eye will not be stimulated sufficiently by a flat-lighted chart to force the brain to perceive the visual impression received by that eye. Trans-illumination, however, is not ordinarily experienced, and thus it can stimulate the suppressed eye sufficiently to force the brain to perceive the visual impressions received by that eye. The stimulating effect of trans-illuminated charts is from five (5) to ten (10) times as great as the stimulating effect of flat-lighted charts. Additional increases in the stimulating effect of the charts can be attained by the movement of portions of the charts. Movement of portion of the charts will stimulate the retina in addition to the macula of the suppressed eye and will thus provide additive stimulations that can force the brain to perceive the visual impressions received by that eye.

For most beneficial results, the stimulus to the suppressed eye must be greater than the stimulus to the dominant eye. Presenting a movable portion of the chart to the suppressed eye and a stationary portion of the chart to the dominant eye while trans-illuminating both portions of the chart will usually provide a sufficiently greater stimulus for the suppressed eye. If additional stimulus is needed for the suppressed eye a filter, of a stimulating color such as red, can be interposed between the portion of the chart presented to the suppressed eye and the source of illumination for that portion of the chart. Alternatively a filter of a sedating color such as blue can be interposed between the portion of the chart presented to the dominant eye and the source of illumination for that portion of the chart. This sedative filter will not directly stimulate the suppressed eye but it will make the stimulation for the suppressed eye stronger than the stimulation for the dominant eye. It is therefore an object of the present invention to interpose filters between the portions of the charts and the sources of illumination therefor to change the relative stimulations provided by those portions of the charts.

The charts provided by the present invention have relatively large, mutually distinct patterns thereon. The mutual distinctiveness of the patterns is necessary to enable the patient to recognize when his brain is perceiving the visual impressions received by both eyes. The large size of the pattern is necessary because the suppression of one eye is frequently so complete that small or moderate-sized patterns would be completely missed. It is therefore an object of the present invention to provide large, mutually distinct patterns for charts used in optical instruments.

The charts provided by the present invention enable the patient to attain (1) better vision in an amblyopic left eye, (2) better vision in an amblyopic right eye, (3) better rotation of the left eye, (4) better rotation of the right eye, (5) better abduction for both eyes, (6) better adduction for both eyes, (7) better fusion for both eyes, (8) better stereopsis for both eyes, (9) better peripheral vision for the left eye, and (10) better peripheral vision for the right eye. Thus these charts can be used to correct or reduce many different types of sight imperfections.

The charts of the present invention are usable with an optical instrument with a rotation-imparting mechanism that can selectively cause movement of one or the other or both of the two portions of the various charts, and which can be separated from those charts. The rotation-imparting mechanism is preferably a motor-driven gear, and it will engage gears in the charts; the gears in the charts causing movement of the pattern-carrying portions and it will engage gears in the charts; the gears in the various charts makes it possible for some charts to cause one pattern to rotate, other charts to cause the other pattern to rotate, and still other charts to have both patterns rotate. The various combinations, made possible with the motor-driven gear and the various charts, enable the patient to correct many different sight imperfections. It is therefore an object of the present invention to provide a motor-driven gear and interchangeable charts; some of which can rotate one pattern, others of which can rotate the other pattern, and still others of which can rotate both patterns.

By having the charts readily interchangeable, the present invention makes it possible to provide a number of charts directed to the same teaching. This is highly desirable because it facilitates the teaching of a particular mental perception without any monotony; the use of a number of different charts directed to the same teaching providing variety and interest. It is therefore an object of the present invention to provide a number of interchangeable charts directed to the same teaching.

The movable pattern-carrying portions of the charts provided by the present invention will preferably be gears. These gears will be wholly enclosed and contained with the chart, and they will be rotated by a small connecting gear which has a portion that projects out from the chart. The projecting portions of the connecting gears will releasably engage the motor-driven gear of the optical instrument and will cause the gears within the charts to rotate. The connecting gears and the pattern-carrying gears can be interrelated in various ways to provide several combinations of relative motion for the patterns, without requiring any change in the nature, size or direction of rotation of the motor-driven gear of the instrument. For example, the left hand pattern can be left stationary or can be rotated, the right hand pattern can be left stationary or can be rotated, the left hand pattern can be rotated in a clockwise direction while the right hand pattern is rotated in a counter-clockwise direction, the left hand pattern can be rotated in a counter-clockwise direction, while the right hand pattern is rotated in a clockwise direction, or both patterns can be rotated in the same direction simultaneously. This arrangement provides a large number of motions to facilitate the teaching of mental perception of visual impressions. It is therefore an object of the present invention to provide charts which contain pattern-carrying gears and connecting gears, and to interrelate those gears so they can provide various combinations of motions without any change in the nature, size or direction of the rotation of the motor-driven gear.

In many instances the patient's brain is unable to fuse mentally the visual impressions received by his eyes. This result is due to the fact that the patient's brain is dominantly perceiving visual impressions from one eye; the patient virtually having monocular vision. One method used in attempting to teach fusion is to cover the dominant eye with a patch and thereby force the patient's brain to perceive the visual impressions received by the suppressed eye. While this method does teach mental perception of visual impressions received by the suppressed eye, it still teaches monocular vision rather than the binocular vision required for fusion; the suppressed eye merely being substituted for the dominant eye. The present invention provides full and complete teaching of fusion by means of complementary patterns. The brain will naturally perceive the pattern presented to the dominant eye, and it will be forced to perceive the pattern presented to the suppressed eye; the rotation and trans-illumination of that pattern providing a stimulus the suppressed eye cannot deny. The brain will then act to fuse the two visual impressions together, thus providing fusion. It is therefore an object of the present invention to provide complementary patterns for the patient's eyes, and to trans-illuminate and rotate the pattern presented to the suppressed eye.

The charts provided by the present invention will be disposed wholly between the lines of sight from the patient's eyes to the source of illumination for the charts. This permits full trans-illumination of the charts when those charts are made of transparent material, and it also permits the use of colored filters between the charts and the source of illumination.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

Figure 2:
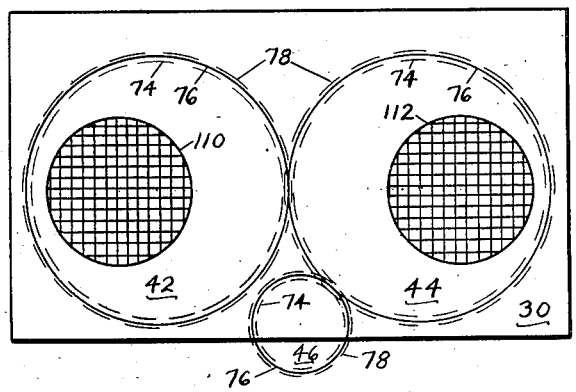
Figure 3:
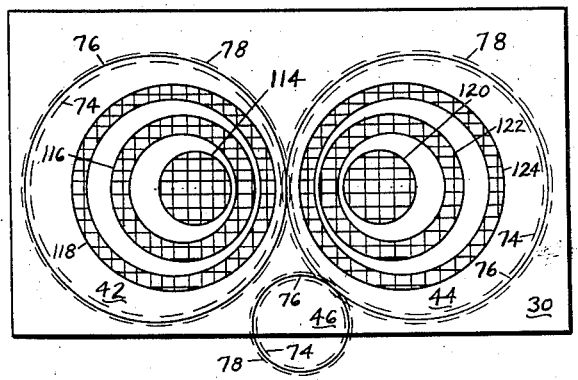
Figure 4:
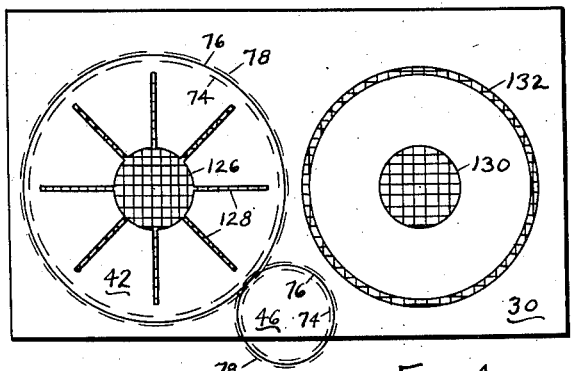
Figure 5:
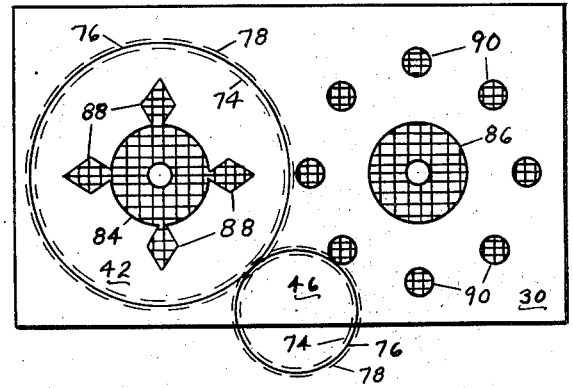
Figure 6:
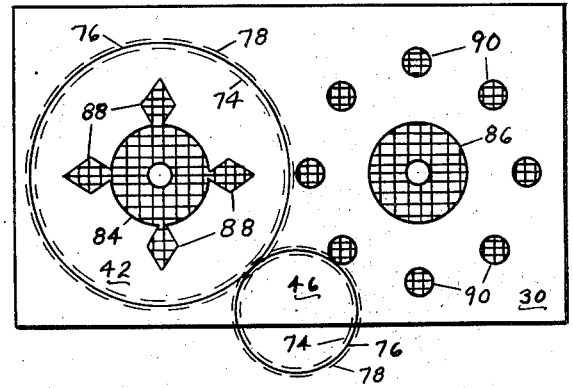
Figure 7:
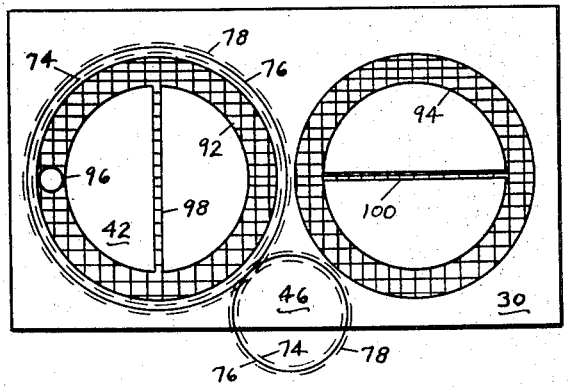
Figure 8:
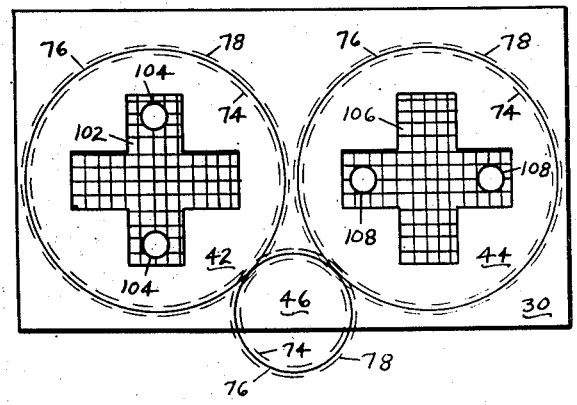

In the drawing,

Fig. 1 is a front elevational view of a chart that is made in accordance with the principles and teachings of the present invention, Fig. 2 is a schematic view of a chart intended to teach abduction and adduction, Fig. 3 is a schematic view of a chart with patterns intended to teach stereopsis, Fig. 4 is a schematic view of a chart with patterns intended to overcome amblyopia, Fig. 5 is a cross-sectional plan view of the chart of Fig. 1, Fig. 6 is a schematic diagram of another chart which has patterns intended to overcome amblyopia, Fig. 7 is a schematic view of a chart which has patterns intended to teach rotation, peripheral vision, and some fusion, and Fig. 8 is a schematic view of a chart with patterns intended to teach full and complete fusion.

Referring to the drawing in detail, a typical chart provided by the present invention is shown in Figs. 1 and 5; that chart being denoted generally by the numeral 30. The chart 30 has a front plate 32 of a transparent, fracture-resistant material such as Lucite, Plexiglas or the like. A back plate 34, of similar material, is provided for the chart 30; and the two plates are coextensive. Spacers 36 are disposed between the edges of the transparent plates 32 and 34, and they space the center portions of those plates apart. A tape 38 begins adjacent a point at one side of the lower center of the plates 32 and 34, extends around the sides and tops of the plates 32 and 34 and terminates adjacent a point at the other side of the lower center of plates 32 and 34. The tape 38 holds the front plate 32 and the back plate 34 and the spacers 36 in assembled relation; thus making the chart a unitary structure. The tape 38 also protects the interior of the chart against entry of dirt, dust or other foreign matter. Pivots 40 are disposed within the interior of the chart 30; those pivots preferably being cemented in recesses in the back plate 34 of the chart 30. These pivots rotatably support gear 42, gear 44, and connecting gear 46. The gears 42 and 44 are preferably made of the same transparent material of which the front and back plates 32 and 34 are made. The connecting gear 46 may also be made of transparent material, but it can be made of opaque material.

As shown particularly in Figure 1, the gears 42 and 44 are wholly enclosed within the space between the front and back plates 32 and 34 of the chart 30, but the connecting gear 46 has the lower portion thereof projecting below the lower edges of those plates. The projecting portion of the gear 46 can extend through a slot formed in the bottom of a substantially light-tight housing of an optical instrument such as shown in said co-pending application; engaging and being acted upon, at such times, by the motor-driven gear of said instrument. The connecting gear 46 of Fig. 1 will drive the gear 42 and the gear 44. The connecting gears of other charts may be arranged to drive one or both of the gears 32 and 44, and in some instances one of the gears 42 and 44 can drive the other. For example, in the charts of Figs. 4, 6, and 7 the connecting gears 46 rotate the gears 42; those gears being the only gears of those charts. In the chart of Fig. 8 the connecting gear 46 engages and drives both of the gears 42 and 44. In the charts of Figs. 2 and 3 the gears 44 engage and drive the gears 42; the gears 44 in turn being engaged and driven by the connecting gears 46. In the various charts 30 the gears 42, 44 and 46 can provide different combinations of motion; but in each and every case the gears 42 and 44 are wholly enclosed within the space defined by plates 32 and 34 of the charts, and the connecting gears 46 have portions extending below the edges of the charts to engage and be driven by the said motor-driven gear.

The gears 42, 44 and 46 are spur gears, and the clearance circles, pitch circles and addendum circles of those gears are dimensioned so those gears can engage and drive each other. The clearance circles, pitch circles and addendum circles of the gears in the charts of Figs. 2 to 8 are denoted by the numerals 74, 76, and 78 respectively. Although not indicated in the drawing, lest the showing thereof becloud the showing of the arrangement of the gears within the charts 30, all portions of the charts 30 that are disposed outwardly of the patterns of those charts will be masked. This masking will usually be done by coating the confronting surfaces of the front and back plates 32 and 34 with a dense black paint or ink, or by gluing black sheets to one or the other or both of those plates. The paint, ink or sheets will define two large circular openings in register with the patterns of the charts; those openings being small enough to permit the teeth of the gears to be hidden but large enough to permit viewing of the full extent of the patterns. This masking of those portions of charts 30 which are disposed outwardly of the patterns of those charts will provide such a strong contrast with the trans-illuminated patterns of the charts that the patient's eyes will be irresistibly drawn to those patterns.

Charts with a number of different patterns can be used with the said optical instrument; the selection of the particular patterns used being determined by the needs of the patient. The chart 30 of Fig. 6 has patterns which eliminate or reduce amblyopia of one eye. That chart has a rotatable pattern-carrying gear 42 driven by connecting gear 46. Painted on, printed on, glued on, or otherwise found on gear 42 are a thick annulus 84 and four diamond-like projections 88. The thick annulus 84 is concentric with the gear 42, and the diamond-like projections 88 are contiguous with and extend radially outwardly from that annulus. The gear 42 will be placed directly opposite the center of the lens in the lefthand opening in the wall of the said optical instrument. A pattern, which consists of a thick annulus 86 and a number of circumferentially-spaced dots 90, is provided at the righthand side of the chart 30; that pattern being painted on, printed on, glued to, or otherwise formed on the front plate 32 or back plate 34 of the chart 30. This second pattern will be stationary and will be directly opposite the center of the lens in the righthand opening of the said optical instrument. The annuli 84 and 86 are congruent; and a circle passing through the tips of the diamond-like projections 88 will have the same diameter and will be congruent with a circle tangent to the inner peripheries of dots 90. The annuli 84 and 86, the projections 88, and the dots 90 will be seen in dense black objects against transparent, illuminated backgrounds.

When the patient looks through the lenses in the openings of the said optical instrument, his brain should perceive two distinct visual impressions, one from each eye, and should fuse these impressions together into one complete impression. That one impression should consist of a fixed annulus, a number of fixed dots spaced outwardly from that annulus, and a number of diamonds moving circumferentially between the annulus and the dots.

The chart 30 of Fig. 6 will be placed in the said optical instrument in such a way that the dot and annulus pattern is opposite the patient's dominant eye while the diamond and annulus pattern is opposite the patient's amblyopic eye. Both the left hand and right hand patterns of chart 30 will be trans-illuminated, and thus both patterns will be stimulative. However, the rotation of the diamond and annulus pattern will provide a greatly increased stimulus for the amblyopic eye, thus forcing the patient's brain to perceive the visual impression from that eye. If the patient "sees" a fixed annulus, a fixed circle of dots, and diamonds moving circumferentially around that annulus, he will be permitted to view this chart for several minutes. The lamps behind the chart will be deenergized periodically, thus giving the patient's eyes a rest followed by strong stimulation. If the patient does not "see" moving diamonds, greater stimulation for the diamond and annulus pattern is required. That greater stimulation can be provided by varying the intensity of illumination from the lamp behind the diamond and annulus pattern, or by interposing a red filter between that lamp and the diamond and annular pattern, or both. Further relative stimulation for the amblyopic eye can be provided by setting the rheostat for the other lamp so the intensity of illumination from that lamp is decreased, or by interposing a blue filter between that lamp and the dot and annulus pattern, or both. The blue filter will further reduce the stimulation for the patient's dominant eye, thus increasing the relative stimulation for the patient's amblyopic eye.

It will be noted that the diamond and annulus pattern and the dot and annulus pattern are large and provide a striking contrast with their transparent, illuminated backgrounds. This is important because the brains of many patients habitually suppress the visual impressions from amblyopic eyes to such an extent that small or medium-sized patterns will not be adequate, and flat-lighted patterns will be useless.

The thick annuli 84 and 86 stimulate the patient's brain to combine the mental perceptions of the two visual impressions together, and the moving diamonds provide such a strong visual impression for the amblyopic eye that the brain cannot suppress it. Continued use of this chart will reduce or eliminate the amblyopia in the patient's amblyopic eye.

If the chart 30 of Fig. 6 is used in the position shown Fig. 6, that chart will stimulate the patient's left eye. To cause that chart to stimulate the patient's right eye, it is only necessary to rotate that chart one hundred and eighty degrees (180) around either of its side edges. In those cases where a stimulation-controlling filter is not needed, a diffusing filter should be employed to provide even illumination of the patterns of the charts.

Fig. 7 shows a chart 30 which is usable to improve the rotation and peripheral vision of the left eye, and to encourage fusion of the visual impressions from both eyes. That chart has a pattern-carrying gear 42 and a connecting gear 46; the pattern on gear 42 being an annulus 92 with a light-transmitting opening 96 therein. The annulus 92 is concentric with gear 42, and it defines a large central opening. A vertical line 98 is fixedly secured to the front plate 32 or back plate 34 of chart 30, and that line bisects the large central opening defined by annulus 92. The righthand pattern of the chart 30 has a fixed annulus 94 and a fixed horizontal line 100. The annuli 92 and 94, and the lines 98 and 100 should all fuse together to provide the impression of one annulus surrounding a slender cross; and the light-transmitting circle should appear as a bright dot moving along the annulus. If the patient watches the center of the slender cross the peripheral vision in his left eye will be stimulated by the bright dot of light; and if he follows that dot the rotation of that eye will be stimulated. The annuli 92 and 94 will encourage fusion, and the lines 98 and 100 will indicate immediately whether or not the brain of the patient is perceiving two visual impressions. If the patient's brain is not perceiving two visual impressions, additional stimulus will be provided for the suppressed eye. This can be done by selection of the proper filter, setting of the lamps at the proper intensity levels, or any desired combination of the two.

If it is desired to develop rotation and peripheral vision in the right eye and to develop fusion in both eyes, the chart 30 can be rotated one hundred and eighty (180) degrees about one of its side edges. The annulus 92 and its moving dot of light will then be presented to the right eye.

The chart 30 shown in Fig. 8 develops fusion of the visual impressions from both eyes. That chart has rotatable gears 42 and 44, and both of those gears engage the connecting gear 46. This enables both of the gears 42 and 44 to rotate in the same direction. Gear 42 has a thick cross 102 thereon, and the vertical arm of that cross has two (2) circular openings 104 therein; those openings being at opposite ends of that arm. Gear 44 has a heavy cross 106 thereon, and the horizontal arm of that cross has two circular openings 108 therein; those openings being at opposite ends of that arm. The heaviness of the crosses 102 and 108 will facilitate fusion of the two visual impressions received by the patient's eyes. The presence or absence of the circles 104 and 108 will indicate the attainment or non-attainment of fusion. If only two circles are "seen" by the patient, additional stimulation will be provided for the suppressed eye by inserting a red filter, or by changing the intensity of the lamps for the patterns or both. It may be that during the use of this chart 30 the patient's brain will momentarily refuse to perceive the visual impressions from both eyes but continued observation of the chart will force the brain to fuse the two visual impressions together. At such times, the patient will "see" one cross with lighted circles at the four tips thereof.

The chart 30 of Fig. 2 has a gear 42 and a gear 44; the gear 44 being driven by connecting gear 46, and acting to drive gear 42. With this arrangement, gears 42 and 44 will rotate in opposite directions. Gear 42 has a large eccentrically-loaded circle 110, and gear 44 has a large eccentrically-located circle 112; the circles 110 and 112 being oppositely located on gears 42 and 44. As the gear 46 is rotated, the gears 42 and 44 will rotate and cause the circles 110 and 112 to approach and move away from each other. When this chart is presented to the patient, the patient's eyes will follow the circles 110 and 112 as they move toward and away from each other; the patient's brain fusing the visual impressions into one circle that moves eccentrically. This provides abduction and adduction of the patient's eyes; excellent teachings for patients whose eyes are "crossed."

The chart 30 of Fig. 3 has gears 42, 44, and 46; gear 46 driving gear 44, and gear 44 driving gear 42. Gear 42 has a circle 114 thereon, an inner annulus 116 and an outer annulus 118. The circle 114 and the annuli 116 and 118 are not concentric; instead, they are eccentric of the gear 42 and of each other. Gear 44 has a circle 120, an inner annulus 122, and an outer annulus 124. The circle 120 and the annuli 122 and 124 also are not concentric; that circle and those annuli being, however, slightly less eccentric than circle 114 and annuli 116 and 118. When the gears 42 and 44 are rotated, the patient's brain will perceive the circles and annuli successively approaching and moving away from the patient in stereoscopic fashion. With continued viewing of the patterns on gears 42 and 44, the circles and annuli seem to move through greater and greater paths. This greatly develops stereopsis.

The chart 30 of Fig. 4 has a gear 42 and a connecting gear 46; the gear 42 carrying a circle 126 at the center thereof and radially-projecting spokes 128. The righthand side of the chart carries a fixed annulus 132 and a concentric circle 130. This chart 30 is similar in purpose to the chart 30 of Fig. 6, being intended to reduce or eliminate amblyopia. The patient's brain should perceive two (2) visual impressions and fuse them into one; that one impression including a fixed circle and a fixed annulus with circumferentially-moving spokes. The movement of the spokes 128 will force the brain to perceive the visual impressions from the amblyopic eye. The chart 30 of Fig. 4 can be alternated with the chart 30 of Fig. 6 and similar charts to avoid monotony. In this way, interest and variety can be provided while sustaining the same teaching.

Correction of amblyopia in the left eye, correction of amblyopia in the right eye, improved rotation of the left eye, improved rotation of the right eye, improved abduction, improved adduction, improved fusion, improved stereopsis, improved peripheral vision for the left eye, and improved peripheral vision for the right eye are all made possible with the charts provided by the present invention. Selection of the proper charts 30 and their insertion in the said optical instrument are all that is needed to initiate correction of the sight imperfections.

The patterns of the charts will usually be defined by black, opaque ink, paint or paper; but those patterns can be defined by opaque or translucent inks, paints or papers of different colors. In fact, different combinations of opaque or translucent colors can be used in making those patterns. This makes additional stimulation possible.

Whereas a preferred embodiment of the present invention has been shown and described in the drawing and accompanying description, it should be obvious to those skilled in the art that various changes may be made in the form of the invention without affecting the scope thereof.

What I claim is:

1. A chart that is selectively disposable in assembled relation with a rotation-imparting optical instrument to teach mental perception of visual impressions and that comprises a front plate, a back plate, said plates defining a space therebetween, a movable support within said space between said front and back plates, a connecting gear of circular disc-like configuration that is intermediate the planes of said front and back plates and that has the faces thereof parallel to said planes, said connecting gear being rotatably mounted on said chart and having one portion of the periphery thereof disposed within said space between said front and back plates while having another portion of the periphery thereof extending outwardly from said space and projecting beyond the periphery of said chart, said other portion of said connecting gear being adapted to be driven by said optical instrument and said connecting gear being adapted to move said movable support whenever said chart is disposed in assembled relation with said optical instrument, a pattern on said movable support, and a second pattern that is in the same plane with said first pattern but is spaced wholly apart from the first said pattern.

2. A chart that is selectively disposable in assembled relation with a rotation-imparting optical instrument to teach mental perception through binocular vision and that comprises a front plate, a back plate, said plates defining a space therebetween, a movable support within said space between said front and back plates, a pivot on said chart for said movable support, a connecting gear of circular disc-like configuration that is intermediate the planes of said front and back plates and that has the faces thereof parallel to said planes, said connecting gear being rotatably mounted on said chart and having one portion of the periphery thereof disposed within said space between said front and back plates while having another portion of the periphery thereof extending outwardly from said space and projecting beyond the periphery of said chart, said other portion of said connecting gear being adapted to be driven by said optical instrument and said connecting gear being adapted to move said movable support whenever said chart is disposed in assembled relation with said optical instrument, a pattern on said movable support, said movable support being a gear of transparent material, said front and back plates having transparent portions in register with said movable support, and a second pattern that is in the same plane with said first pattern but is spaced wholly apart from the first said pattern.

3. A chart that is selectively disposable in assembled relation with a rotation-imparting optical instrument to teach mental perception of visual impressions and that comprises a front plate, a back plate, said plates defining a space therebetween, a movable support within said space between said front and back plates, a connecting gear of circular disc-like configuration that is intermediate the planes of said front and back plates and that has the faces thereof parallel to said planes, said connecting gear being rotatably mounted on said chart and having one portion of the periphery thereof disposed within said space between said front and back plates while having another portion of the periphery thereof extending outwardly from said space and projecting beyond the periphrey of said chart, said other portion of said connecting gear being adapted to be driven by said optical instrument and said connecting gear being adapted to move said movable support whenever said chart is disposed in assembled relation with said optical instrument, a pattern on said movable support, said movable support being registerable with one eye of the patient using the optical instrument, and a second pattern that is laterally spaced from said movable support for registry with the other eye of the patient using said instrument.

4. A chart that is selectively disposable in assembled relation with a rotation-imparting optical instrument to teach mental perception of visual impressions and that comprises a front plate, a back plate, said plates defining a space therebetween, a movable support within said space between said front and back plates, a connecting gear of circular disc-like configuration that is intermediate the planes of said front and back plates and that has the faces thereof parallel to said planes, said connecting gear being rotatably mounted on said chart and having one portion of the periphery thereof disposed within said space between said front and back plates while having another portion of the periphery thereof extending outwardly from said space and projecting beyond the periphery of said chart, said other portion of said connecting gear being adapted to be driven by said optical instrument and said connecting gear being adapted to move said movable support whenever said chart is disposed in assembled relation with said optical instrument, a pattern on said movable support, said movable support being registerable with one eye of the patient using the optical instrument, and a second pattern that is laterally spaced from said movable support for registry with the other eye of the patient using said instrument, said second pattern being mounted on a second movable support, said second movable support responding to rotation of said connecting gear to rotate and thereby rotate said second pattern.

5. A chart that is selectively disposable in assembled relation with a rotation-imparting optical instrument to teach mental perception of visual impressions and that comprises a front plate, a back plate, said plates defining a space therebetween, a movable support within said space between said front and back plates, a connecting gear of circular disc-like configuration that is intermediate the planes of said front and back plates and that has the faces thereof parallel to said planes, said connecting gear being rotatably mounted on said chart and having one portion of the periphery thereof disposed within said space between said front and back plates while having another portion of the periphery thereof extending outwardly from said space and projecting beyond the periphery of said chart, said other portion of said connecting gear being adapted to be driven by said optical instrument and said connecting gear being adapted to move said movable support whenever said chart is disposed in assembled relation with said optical instrument, a pattern on said movable support, said movable support being registerable with one eye of the patient using the optical instrument, and a second pattern that is laterally spaced from said movable support for registry with the other eye of the patient using said instrument, said second pattern being mounted on a second movable support, said second movable support engaging and being driven by the first said movable support whereby said movable supports rotate in opposite directions about their axes, said patterns being eccentric of said axes to teach abduction and adduction.

6. A chart that is selectively disposable in assembled relation with a rotation-imparting optical instrument to teach mental perception of visual impressions and that comprises a front plate, a back plate, said plates defining a space therebetween, a movable support within said space between said front and back plates, a connecting gear of circular disc-like configuration that is intermediate the planes of said front and back plates and that has the faces thereof parallel to said planes, said connecting gear being rotatably mounted on said chart and having one portion of the periphery thereof disposed within said space between said front and back plates while having another portion of the periphery thereof extending outwardly from said space and projecting beyond the periphery of said chart, said other portion of said connecting gear being adapted to be driven by said optical instrument and said connecting gear being adapted to move said movable support whenever said chart is disposed in assembled relation with said optical instrument, a pattern on said movable support, said movable support being registerable with one eye of the patient using the optical instrument, and a second pattern that is laterally spaced from said movable support for registry with the other eye of the patient using said instrument, said second pattern being mounted on a second movable support, said second movable support engaging and being driven by the first said movable support whereby said movable supports rotate in opposite directions about their axes, said patterns being eccentric of said axes with one of said patterns being slightly less cecentric whereby said patterns provide a moving stereoscopic pattern.

7. A chart that is one of a plurality of charts that are interchangeably and selectively disposable in assembled relation with a rotation-imparting optical instrument to teach mental perception of visual impressions, and that comprises a front plate, a back plate, said plates defining a space therebetween, a movable support within said space between said front and back plates, a connecting gear of circular disc-like configuration that is intermediate the planes of said front and back plates and that has the faces thereof parallel to said planes, said connecting gear being rotatably mounted on said chart and having one portion of the periphery thereof disposed within said space between said front and back plates while having another portion of the periphery thereof extending outwardly from said space and projecting beyond the periphery of said chart, said other portion of said connecting gear being adapted to be driven by said optical instrument and said connecting gear being adapted to move said movable support whenever said chart is disposed in assembled relation with said optical instrument, a pattern on said movable support, and a second pattern that is in the same plane with said first pattern but is spaced wholly apart from the first said pattern.

8. A chart that is one of a plurality of charts that are interchangeably and selectively disposable in assembled relation with a rotation-imparting optical instrument to teach mental perception of visual impressions, and that comprises a front plate, a back plate, said plates defining a space therebetween, a movable support within said space between said front and back plates, a connecting gear of circular disc-like configuration that is intermediate the planes of said front and back plates and that has the faces thereof parallel to said planes, said connecting gear being rotatably mounted on said chart and having one portion of the periphery thereof disposed within said space between said front and back plates while having another portion of the periphery thereof extending outwardly from said space and projecting beyond the periphery of said chart, said other portion of said connecting gear being adapted to be driven by said optical instrument and said connecting gear being adapted to move said movable support whenever said chart is disposed in assembled relation with said optical instrument, a pattern on said movable support, said movable support being registerable with one eye of the patient using the optical instrument, and a second pattern that is laterally spaced from said movable support for registry with the other eye of the patient using said instrument.

References Cited in the file of this patent
UNITED STATES PATENTS

| Re. 21,082 | Idzal | May 16, 1939 |
| 2,097,161 | Mason | Oct. 26, 1937 |